United States Patent [19]
Davey et al.

[11] Patent Number: 5,333,917
[45] Date of Patent: Aug. 2, 1994

[54] TUBE ATTACHMENT CLAMP SYSTEM

[75] Inventors: Mark J. Davey, North Aurora; Michael R. Goodrich, West Chicago, both of Ill.

[73] Assignee: Senior Engineering Investments, B.V, Amsterdam, Netherlands

[21] Appl. No.: 926,345

[22] Filed: Aug. 6, 1992

[51] Int. Cl.⁵ .............................................. F16L 23/00
[52] U.S. Cl. .................................... 285/205; 285/412; 285/917; 248/56
[58] Field of Search ................... 248/56; 285/187, 368, 285/412, 917, 205, 208

[56] References Cited

U.S. PATENT DOCUMENTS

| | | | |
|---|---|---|---|
| 3,704,995 | 12/1972 | Hetherington | 285/412 X |
| 3,912,306 | 10/1975 | McCormick | 285/412 X |
| 4,117,674 | 10/1978 | Tadokoro | 285/368 X |
| 4,209,177 | 6/1980 | Hall | 285/368 X |
| 4,503,680 | 3/1985 | Wood | 285/368 X |

Primary Examiner—Eugenia Jones
Attorney, Agent, or Firm—Dick and Harris

[57] ABSTRACT

A clamp system for maintaining an end of a high temperature fluid bearing tube in substantially sealing engagement with a surface and in substantial alignment with an aperture in the surface positioned substantially transverse to the tube. A bracket member is provided to hold the end of the tube against the surface. An annular flange is provided on the end of the tube, to form the seal and provide a surface against which the bracket member pushes. The annular flange is advantageously configured so as to position the seal radially away from the tube so as to reduce transmission of heat from the fluid within the tube to the seal, to, in turn, protect the material of the mating surfaces from heat degradation.

24 Claims, 1 Drawing Sheet

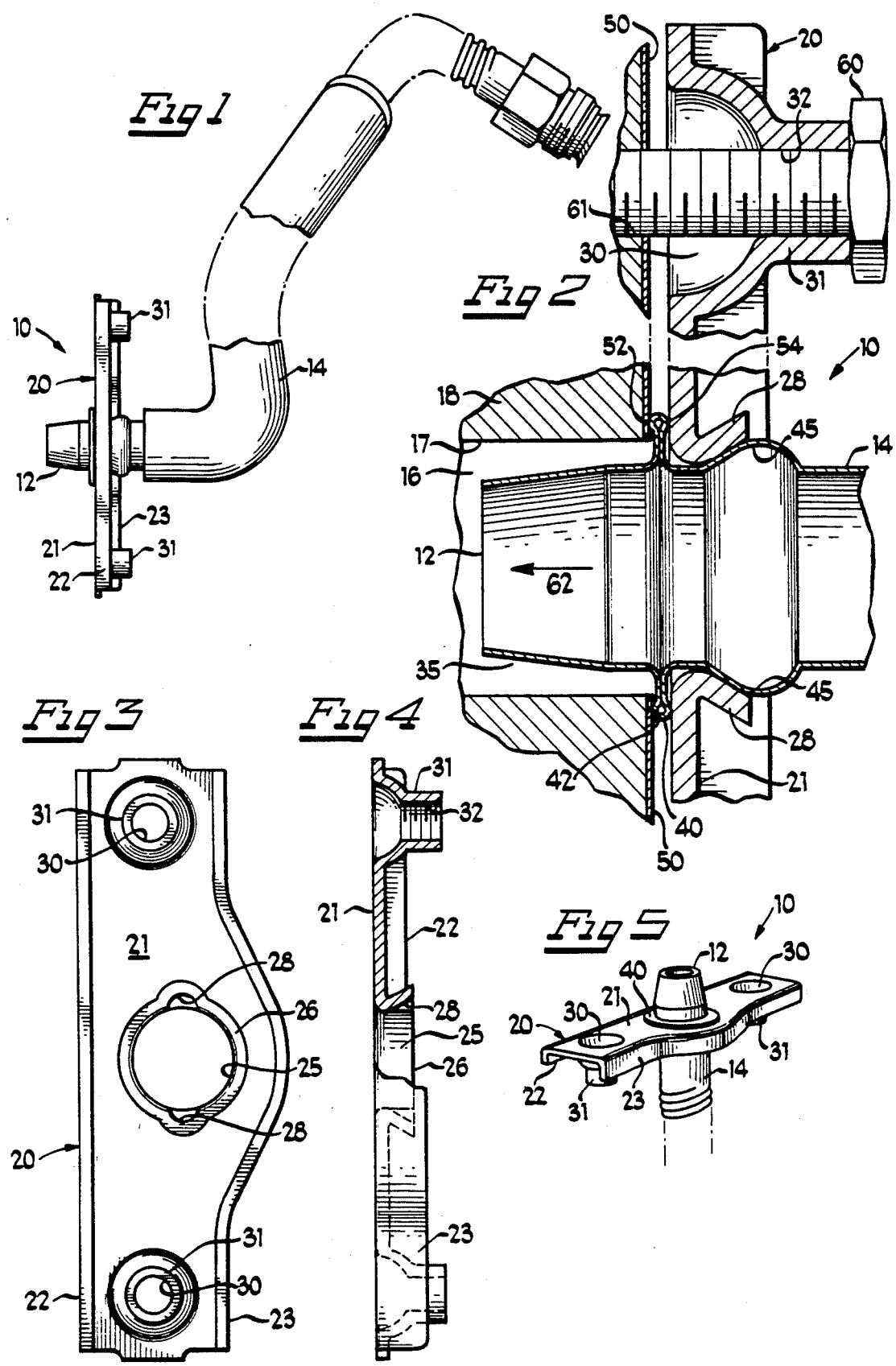

TUBE ATTACHMENT CLAMP SYSTEM

BACKGROUND OF THE INVENTION

The present invention relates to clamp systems for joining the ends of tubes to surfaces, and in particular to clamp systems for joining the ends of a high temperature fluid bearing tube, such as an exhaust gas recirculation (EGR) tube, to an intake manifold or EGR valve of an internal combustion engine.

A modern automobile internal combustion motor requires or is provided with a variety of co-operative apparatuses which involve the use of tubes to transmit pressurized fluid (such as exhaust) or provide a vacuum, to a portion of the motor block, throttle body, intake or exhaust manifolds, or other components. For an example, an exhaust gas recirculation (EGR) tube directs hot exhaust gases from the exhaust manifold or another part of the exhaust system, to the throttle body or air intake manifold, which improves the quality of the vehicle's exhaust emissions and can improve fuel efficiency. In the environment of an EGR tube, in particular the end of the EGR tube which is affixed to the "hot end" (the exhaust manifold or similar source), the temperatures of the gases may well reach significantly above 1,000 degrees Fahrenheit.

Typically, an accessory tube will be insertingly received at its ends directly into apertures provided in the side walls of the respective motor components. Each end of the tube may be provided with an outwardly-extending, annular bead, to, in part, limit the extent to which the tube extends into the side wall of the motor component, and as well to provide a surface for a clamp to hold the tube end in place, and to provide a seal to prevent the escape of the gases or other fluids in the tube to the surrounding environment.

A typical prior art clamp used to secure such a tube end may be fabricated as a simple plate-like bracket member, with a tube aperture and one or more bolt apertures. The side of the bracket member, which would face the surface of the component to which the tube end is being clamped, would press the bead or flange projecting radially outward from the tube between the bracket member and the component surface. Typically, the flange may consist of either a solid or hollow radial projection, which might be either directly formed from the material of the tube, such as by drawing and compressing a fold of the tube outwardly to form the flange, or by affixing, such as by welding or brazing, a separate member onto the tube to form the flange. In addition, the flange typically would have a substantially uniform thickness along its radial width, such that the flange has a relatively wide annular area of surface contact with both the bracket member and the surface.

It is possible to provide gaskets which facilitate the creation of an effective fluid-tight seal for such embodiments. Such gaskets are capable of withstanding, for at least economically effective periods of time, the high temperatures and thermal cycling associated with such environments. It is desirable, however, to obtain a maximum possible lifespan for all the involved components, in order to lengthen the periods between necessary inspections and subsequent replacement operations, so as to reduce maintenance costs and efforts. It is known that the heat of the fluid passing through the tube can migrate radially through the flange and expose the gasket and mating surfaces of the housing and bracket member to additional and higher temperatures than those encountered directly through the surface of the component against which the gasket is positioned.

Accordingly, it is desirable to provide a clamp system having a construction which reduces the transfer of heat radially from the high-temperature fluid bearing tube, so as to further protect the seal and mating surfaces and extend the functioning lifespan of those components subject to heat degradation.

An additional consideration is the drive to continually reduce the cost of the component parts in an internal combustion engine. For example, substantial cost savings can be achieved by fabricating the intake manifold and/or throttle body from aluminum. However, continued direct exposure of aluminum to recirculated exhaust gases and the heat such gases contain is potentially damaging to components made from aluminum.

Accordingly, it is an additional object of the invention, to provide a clamp system, for use in an exhaust gas recirculation system, which enables the use of lower cost materials, such as aluminum, in the construction of the components receiving the recirculated gases, such as intake manifolds and throttle bodies.

A typical construction of such prior art clamp systems involves affixing the tube end to the bracket member, by welding or brazing, which can be a time consuming and costly process, considering the relatively small size and other costs of the component.

It is accordingly still another object of the present invention to provide a clamp system for clamping an end of a tube to a component housing, in which the tube end is fixedly held by a bracket member without the use of welding or brazing.

These and other objects of the invention will become apparent in light of the present Specification, Claims and Drawings.

SUMMARY OF THE INVENTION

The present invention comprises a clamp system for maintaining an end of fluid bearing tube having a longitudinal axis in substantially sealing abutment with the surface and in substantial alignment with an aperture disposed in said surface. The tube end is to be disposed substantially perpendicular to the surface. The clamp system comprises bead sealing means, operably disposed adjacent to and circumferentially about the tube end, for establishing a fluid-tight seal about said tube end at a radially spaced distance from the tube end, substantially transverse to the longitudinal axis. The bead sealing means includes a bead contact region operably disposed circumferentially about the tube end and at a substantially maximized radially spaced distance thereto, transverse to the longitudinal axis, for maintaining the bead sealing means free from contact with the surface in which the aperture is disposed, between the bead contact region and the tube end to substantially reduce the transfer of heat within the high temperature fluid through the bead sealing means to said surface.

Retaining means are operably configured to insertingly receive the tube end and are affixable in juxtaposed relation to the surface to maintain the tube end substantially perpendicular to said surface and in substantial alignment with the aperture. The retaining means maintain the bead contact region in substantial sealing contact with the surface.

In the preferred embodiment of the invention, at least a portion of the tube end is insertingly received within the aperture. The aperture has an internal surface having an internal diameter which is substantially greater than the external diameter of the portion of the tube end which is insertingly received. The retaining means is accordingly operably configured to maintain the tube end in substantially concentric, inserted alignment within the oversized aperture, so as to provide an insulating air gap region circumferentially disposed about the insertingly received portion of the tube end, to further protect the internal surface of the aperture from the the heat of the high temperature fluid.

First engagement means for affixing the tube end to the retaining means, are operably arranged on the retaining means in longitudinally downwardly spaced relation from the annular bead. Second engagement means are operably disposed in the tube end, in longitudinally downwardly spaced relation from the annular bead, and are operably juxtaposed with the first engagement means for co-operably biasing the retaining means against the annular bead. Clamping means are operably disposed on the retaining means, in substantially outwardly, transversely spaced relation from the tube end, for fixing the retaining means against the surface to clamp the annular bead between the surface and retaining means, to create a substantially fluid tight seal therebetween.

In the preferred embodiment of the invention, the retaining means comprises a substantially planar flange member which has a tube aperture operably arranged therein to insertingly receive the end of the tube. A cylindrical collar may be operably disposed, substantially, circumferentially and concentrically about the tube aperture, to extend from the planar flange member substantially parallel to the longitudinal axis of the tube end.

The bead sealing means, in the preferred embodiment, comprises an annular bead projecting radially outward from the tube end. The annular bead is positioned substantially at the portion of the tube adjacent the oversized aperture in the surface. The annular bead also has a radially inner portion, a radially outer portion, a radially outward most periphery, and a bulbous cross sectional configuration. The bead contact region so formed as a circumferential region in the radially outer portion, operably extending further toward said surface, in a direction substantially parallel to the longitudinal axis, than the radially inner portion. The substantially bulbous cross-sectional configuration of the annular bead includes a radial width which extends perpendicular to and radially outward from the longitudinal axis of the tube ends. The cross-sectional configuration also has a varying axial thickness which extends parallel to the longitudinal axis of the tube ends. The radial width is substantially greater than the axial thickness and the axial thickness is greater in the radial outer portion than in the radially inner portion. In the preferred embodiment, the radially outer portion has a curved convex configuration, at least in a direction parallel to the longitudinal axis, toward the surface, such that the bead contact region is substantially formed as a narrow, outwardly displaced, circumferential contact surface.

The first engagement means are preferably configured to be at least one radially outwardly extending contact surface operably disposed in the cylindrical collar. The second engagement means comprise at least one radially outwardly extending contact contour operably formed in the tube end substantially, immediately adjacent the at least one contact surface in the cylindrical collar, to press against the at least one contact surface and cause the retaining means to bear against the annular bead. In an alternative preferred embodiment of the invention, the first engagement means comprise two radially outwardly extending contact surfaces operably disposed on the cylindrical collar, while the second engagement means comprise two radially outwardly extending contact contours operably formed in the tube end substantially adjacent the two contact surfaces and cause the retaining means to bear against the annular bead.

In the preferred embodiment of the invention, the clamping means comprises at least one aperture means for receiving a bolt operably disposed in the substantially planar flange member in transversally spaced relation to the tube aperture. In an alternative preferred embodiment, the at least one aperture means comprises two aperture means disposed in symmetrical relationship to one another, with said tube aperture positioned between the two aperture means.

BRIEF DESCRIPTION OF THE DRAWINGS

FIG. 1 is a top plan view of an exhaust gas recirculation tube having, disposed at one end, the clamp system according to the present invention;

FIG. 2 is an elevated side view, in cross-section, of the clamp system, shown maintaining of the tip of an EGR tube in position within the clamp and oversized aperture;

FIG. 3 is a top plan view of the bracket member of the clamp system according to the present invention;

FIG. 4 is an elevated side view of the bracket member according to FIG. 3; and

FIG. 5 is a top-side perspective view of the clamp system.

DETAILED DESCRIPTION OF THE DRAWINGS

While this invention is susceptible of embodiment in many different forms, there is shown in the drawings and will be described herein in detail, a specific embodiment, with the understanding that the present disclosure is to be considered as an exemplification of the principles of the invention and is not intended to limit the invention to the embodiments illustrated.

The components of clamp system 10, according to a preferred embodiment of the invention are shown in FIGS. 1, 2, and in perspective in FIG. 5. System 10 may be used, in a contemplated application, to affix the inlet end 12 of a tube 14 in inserting alignment with oversized aperture 16 in a housing 18. For example, tube 14 may be an exhaust gas recirculation (EGR) tube, used for directing exhaust gases from an exhaust manifold (not shown) to an intake manifold or throttle body of an internal combustion engine. Housing 18, for example, may be the housing of an intake manifold.

Clamp system 10 includes bracket member 20, having facing portion 21, and flanges 22 and 23, which are turned substantially perpendicular to facing portion 21. Tube aperture 25 is, in the preferred embodiment of the invention, arranged in facing portion 21, substantially centrally along the longitudinal axis of bracket member 20. Bracket member 20 as shown in FIGS. 3 and 4, is provided with a generally rectangular shape, but with a slightly widened portion along its central area, relative to its longitudinal axis, in order to accommodate the width of tube aperture 25. This configuration is provided so as to economize on the amount of materials required for both reduced costs as well as reduced weight. Alternatively, a simple rectangular facing portion 21 might also be contemplated. Substantially circular flange 26 is formed around tube aperture 25. Circular flange 26 has arranged on it at least two pockets 28, the function of which will be described hereinbelow.

One or more bolt holes 30 are also arranged in facing portion 21, to enable the secure attachment of bracket member 20 to housing 18. In the preferred embodiment of the invention, in order to provide for substantially uniform application of securing force, two bolt holes 30 are positioned on opposite sides and at equal distances from the center of tube aperture 25. In the preferred embodiment of the invention, bolts 60 extend through housing 18 and project outwardly from housing 18 to receive bracket member 20. Bolt holes 30 may comprise simple apertures, or, as shown, deep depressions 31 are also provided so as to facilitate locating and engaging bolts 60 during assembly (see FIG. 2). Depressions 31 may have threads 32 arranged on their internal surfaces, for also engaging the bolts to provide added and uniformly applied securing force to bracket member 20. In an alternative embodiment, bolts 30 may be attached inwardly through bracket member 20 into housing 18.

Clamp system 10 also includes a unique and advantageous configuration of the end of tube 14 which is to be engaged by bracket member 20 and inserted into oversized aperture 16 of housing 18.

Tip 12 of tube 14 is generally configured to be tapered so that fluid flow 62 is deflected away from inside surface 17 of oversized aperture 16. When tube 14 is secured by bracket member 20, an insulating air gap 35 is provided substantially completely around tube 14 and tip 12, so as to insulate and prevent hot fluid contact between surface 17 of oversized aperture 16 and tube 14. Prior to the inserting receipt of tube 14 by bracket member 20, an integral annular flange 40 is formed on tube 14. Annular flange 40 has a generally bulbous configuration. The distance by which annular flange 40 extends radially outward from tube 14 is substantially greater than the thickness of annular flange 40 at its widest point 42. In addition, annular flange 40 is thinner in its radially inner regions closure to tube 14, and has its thickest point 42 at substantially its maximum radial distance from tube 14.

The portions of tube 14, beyond annular flange 40 and away from tip 12, are initially formed with a diameter less than tube aperture 25. After tube 14 has been inserted into tube aperture 25, and annular flange 40 is brought up against facing portion 21, lateral bulges 45 are integrally formed in tube 14. Lateral bulges 45 are arranged to be in alignment with and substantially completely occupy, in a slightly compressive manner, pockets 28 in circular flange 26. The facing portion 21, circular flange 26 and pockets 28 are thereby compressed between annular flange 40 and lateral bulges 45. Clamping system 10 is now ready for affixation to housing 18.

In the preferred embodiment of the invention, housing 18 will have appropriate bolt apertures 61 so as to be in respective alignment with tube aperture 25 and threaded bolt holes 30 of bracket member 20, so as to enable the inserting receipt of tip 12 within oversized aperture 16 to have the air gap 35 alignment shown in FIG. 2. For clarity, only one bolt hole 30, bolt aperture 61 and bolt 60 are shown in FIG. 2.

Prior to the affixation of clamp system 10 in place against housing 18, gasket 50 is typically positioned around aperture 16 to facilitate sealing. When bolt holes 30 have been aligned with the threaded bolt holes 61 in housing 18 and the bolts have been tightened, annular flange 40 is brought up against gasket 50. Line contact between annular flange 40, gasket 50 and facing portion 21, occurs primarily at points 52 and 54, respectively, which correspond to widest point 42 of annular flange 40. Contact points 52 and 54, in fact, actually reflect, in the two dimensional view of FIG. 2, circular contact regions which provide minimum contact surfaces which create an optimized seal between points 52 and gasket 50, once bracket member 20 has been bolted against housing 18. In addition, contact points 52 provides a narrow thermal conductivity region, so as to impede the transfer of heat through and from tube 14 through annular flange 40 outwardly. By moving the point of sealing contact radially outwardly from tube 14, an oversized aperture 16 can be used to create a maximum air gap 35 insulator to protect housing 18 materials from the damaging effects of heat in an economical manner to prolong durability.

The foregoing construction of the preferred embodiment of the clamp system has numerous advantages. Because of the displacement of the sealing surfaces annular flange 40 away from tube 14, the aperture 16 can be oversized to provide maximum air gap 35 insulation protection to housing 18 which allows the use of lower cost materials in housing 18. In particular, in the preferred embodiment of the invention, housing 18 is fabricated from aluminum. The configuration of the present invention is capable of being detached from housing 18 to permit the replacement of gasket 50, without destructive measures, as would be the case, for example, with welded or brazed-in-place fittings.

The foregoing description and drawings merely explain and illustrate the invention and the invention is not limited thereto except insofar as the appended claims are so limited, as those skilled in the art who have the disclosure before them, will be able to make modifications and variations therein without departing from the scope of the invention.

We claim:

1. A clamp system for maintaining an end of a tube bearing high-temperature fluid, in substantially sealing engagement with a surface and in substantial alignment with an aperture disposed in said surface, said tube end being arranged substantially perpendicular to said surface with a portion of said tube being arranged adjacent said aperture in said surface, said tube further having a longitudinal axis, said clamp system comprising:

bead sealing means, operably disposed adjacent to and about said tube end, for establishing a fluid-tight seal about said tube end at a radially spaced relation from said tube end, transverse to said longitudinal axis therefrom, said bead sealing means including a bead contact region operably arranged about said tube end and at a substantially maximized radially spaced distance from said tube end, transverse to said longitudinal axis, said bead sealing means being free from contact with said surface in which said aperture is disposed between said bead contact region and said tube end, so as to substantially reduce the transfer of heat from within said high temperature fluid from said tube end and through said bead sealing means to said surface; and retaining means operably configured to insertingly receive said tube end, said retaining means being further operably configured to be affixable in juxtaposed relation to said surface for maintaining said tube end substantially perpendicular to said surface and in said substantial alignment with said aperture, said retaining means being further operably configured, when disposed in said juxtaposed relation to said surface, to maintain said bead contact region of said bead sealing means in substantially sealing contact with said surface, so as to provide an improved, extended life, fluid-tight seal in a high temperature environment.

2. The clamp system according to claim 1 wherein at least a portion of said tube end is insertingly received within said aperture, and said aperture has an internal surface having an internal diameter substantially greater than an external diameter of said insertingly received portion of said tube end, and said retaining means is further operably configured to maintain said tube end in substantially concentric, inserted alignment within said aperture, so as to provide an insulating air gap region circumferentially disposed about said insertingly received portion of said tube end, to further protect said internal surface from said heat from said high temperature fluid.

3. The clamp system according to claim 1 wherein said bead sealing means comprises:

an annular bead, projecting radially outwardly from said tube end and positioned substantially at the portion of the tube arranged adjacent said aperture in said surface, said annular bead having a radially inner portion, a radially outer portion, and a radially outwardmost periphery, said bead contact region being formed as a circumferential region in said radially outer portion, operably extending farther toward said surface, in a direction substantially parallel to said longitudinal axis, than said radially inner portion.

4. The clamp system according to claim 3 wherein said annular bead has a substantially bulbous cross-sectional configuration, said substantially bulbous cross-sectional configuration including a radial width, extending perpendicular to and radially outwardly from said longitudinal axis of said tube end, and a varying axial thickness, extending parallel to said longitudinal axis, said radial width being substantially greater than said axial thickness, and said axial thickness being substantially greater in said radially outer portion than in said radially inner portion, said radially outer portion having a curved convex configuration, at least in a direction parallel to said longitudinal axis, toward said surface, such that said bead contact region is substantially formed as a narrow, outwardly displaced, circumferential contact surface.

5. The clamp system according to claim 4 wherein said retaining means further includes first engagement means for affixing said tube end to said retaining means, operably arranged on said retaining means in longitudinally spaced relation from said annular bead;

said clamp system further comprising second engagement means operably disposed in said tube end, in longitudinally spaced relation from said annular bead and operably aligned with and juxtaposed to said first engagement means for co-operably biasing said retaining means against said annular bead; and clamping means, operably disposed on said retaining means in transversely spaced relation from said tube end for affixing said retaining means against said surface to clamp said bead between said surface and said retaining means, so as to create a substantially fluid-tight seal therebetween.

6. The clamp system according to claim 5 wherein said retaining means further comprises:

a substantially planar flange member having a tube aperture operably arranged therein for insertingly receiving said end of said tube.

7. The clamp system according to claim 6 wherein said retaining means further comprises:

a cylindrical collar, operably disposed substantially circumferentially and concentrically about said tube aperture and extending from said planar flange member substantially parallel to said longitudinal axis.

8. The clamp system according to claim 7 wherein said first engagement means comprise:

at least one radially outwardly extending contact surface operably disposed in said cylindrical collar.

9. The clamp system according to claim 8 wherein said second engagement means comprise:

at least one radially outwardly extending contact contour operably formed in said tube end substantially immediately adjacent said at least one contact surface in said cylindrical collar, to press against said at least one contact surface and cause said retaining means to bear against said annular bead.

10. The clamp system according to claim 9, wherein said first engagement means comprises two radially outwardly extending contact surfaces operably disposed in said cylindrical collar.

11. The clamp system according to claim 10 wherein said second engagement means comprises two radially outwardly extending contact contours operably formed in said tube end substantially immediately adjacent said two contact surfaces in said cylindrical collar, to press against said contact surfaces and cause said retaining means to bear against said annular bead.

12. The clamp system according to claim 6 wherein said clamping means comprise:

at least one aperture means for receiving a bolt operably disposed in said substantially planar flange in member in transversely spaced relation to said aperture disposed in said surface.

13. The clamp system according to claim 12 wherein said at least one aperture means for receiving a bolt comprises:

two aperture means operably disposed in symmetrical relationship to one another, with said tube aperture positioned between said two aperture means.

14. A clamp system for maintaining an end of a tube bearing high-temperature fluid, in substantially sealing engagement with a surface and in substantial alignment with an aperture disposed in said surface, said tube end being arranged substantially perpendicular to said surface with a portion of said tube being arranged adjacent said aperture in said surface, said tube further having a longitudinal axis, said clamp system comprising:

bead sealing means, operably disposed adjacent to and about said tube end, for establishing a fluid-tight seal about said tube end at a radially spaced relation from said tube end, transverse to said longitudinal axis therefrom, said bead sealing means including a bead contact region operably arranged about said tube end and at a substantially maximized radially spaced distance from said tube end, transverse to said longitudinal axis therefrom, so as to substantially reduce the transfer of heat within said high temperature fluid from said tube end and through said bead sealing means to said surface, and retaining means operably configured to insertingly receive said tube end, said retaining means being further operably configured to be affixable in juxtaposed relation to said surface for maintaining said tube end substantially perpendicular to said surface and in said substantial alignment with said aperture, said retaining means being further operably configured, when disposed in said juxtaposed relation to said surface, to maintain said bead contact region of said bead sealing means in substantially sealing contact with said surface, so as to provide an improved, extended life, fluid-tight seal in a high temperature environment, said bead sealing means comprising an annular bead, projecting radially outwardly from said tube end and positioned substantially at the portion of the tube arranged adjacent said aperture in said surface, said annular being having a radially inner portion, a radially outer portion, and a radially outermost periphery, said bead contact region being formed as a circumferential region in said radially outer portion, operably extending farther toward said surface, in a direction substantially parallel to said longitudinal axis, than said radially inner portion.

15. The clamp system according to claim 14 wherein said annular bead has a substantially bulbous cross-sectional configuration, said substantially bulbous cross-sectional configuration including a radial width, extending perpendicular to and radially outwardly from said longitudinal axis of said tube end, and a varying axial thickness, extending parallel to said longitudinal axis, said radial width being substantially greater than said axial thickness, and said axial thickness being substantially greater in said radially outer portion than in said radially inner portion, said radially outer portion having a curved convex configuration, at least in a direction parallel to said longitudinal axis, toward said surface, such that said bead contact region is substantially formed as a narrow, outwardly displaced, circumferential contact surface.

16. The clamp system according to claim 15 wherein said retaining means further includes first engagement means for affixing said tube end to said retaining means, operably arranged on said retaining means in longitudinally spaced relation from said annular bead, said clamp system further comprising second engagement means operably disposed in said tube end, in longitudinally spaced relation from said annular bead and operably aligned with and juxtaposed to said first engagement means for co-operably biasing said retaining means against said annular bead; and clamping means, operably disposed on said retaining means in transversely spaced relation from said tube end for affixing said retaining means against said surface to clamp said bead between said surface and said retaining means, so as to create a substantially fluid-tight seal therebetween.

17. The clamp system according to claim 16 wherein said retaining means further comprises:
a substantially planar flange member having a tube aperture operably arranged therein for insertingly receiving said end of said tube.

18. The clamp system according to claim 17 wherein said retaining means further comprises:
a cylindrical collar, operably disposed substantially circumferentially and concentrically about said tube aperture and extending from said planar flange member substantially parallel to said longitudinal axis.

19. The clamp system according to claim 18 wherein said first engagement means comprises:
at least one radially outwardly extending contact surface operably disposed in said cylindrical collar.

20. The clamp system according to claim 20 wherein said second engagement means comprises:
at least one radially outwardly extending contact contour operably formed in said tube end substantially immediately adjacent said at least one contact surface in said cylindrical collar, to press against said at least one contact surface and cause said retaining means to bear against said annular bead.

21. The clamp system according to claim 20, wherein said first engagement means comprises two radially outwardly extending contact surfaces operably disposed in said cylindrical collar.

22. The clamp system according to claim 21 wherein said second engagement means comprises two radially outwardly extending contact contours operably formed in said tube end substantially immediately adjacent said two contact surfaces in said cylindrical collar, to press against said contact surfaces and cause said retaining means to bear against said annular bead.

23. The clamp system according to claim 17 wherein said clamping means comprises:
at least one aperture means for receiving a bolt operably disposed in said substantially planar flange member in transversely spaced relation to said aperture in said surface.

24. The clamp system according to claim 23 wherein said at least one aperture means for receiving a bolt comprises:
two aperture means operably disposed in symmetrical relationship to one another, with said tube aperture positioned between said two aperture means.

* * * * *

UNITED STATES PATENT AND TRADEMARK OFFICE
CERTIFICATE OF CORRECTION

PATENT NO. : 5,333,917
DATED : August 2, 1994
INVENTOR(S) : Davey et al.

It is certified that error appears in the above-indentified patent and that said Letters Patent is hereby corrected as shown below:

Col. 4, Line 10    After "surfaces" insert -- in the cylindrical collar - to press against the two contact surfaces --.

Col. 9, Line 28    After "annular", delete "being" and insert --bead --.

Signed and Sealed this

Ninth Day of May, 1995

Attest:

BRUCE LEHMAN

*Attesting Officer*    Commissioner of Patents and Trademarks